United States Patent [19]

Nakamura et al.

[11] Patent Number: 4,583,846

[45] Date of Patent: Apr. 22, 1986

[54] SLIT EXPOSURE TYPE COPYING MACHINE CAPABLE OF COPYING WITH ANAMORPHIC MAGNIFICATION

[75] Inventors: Hiromu Nakamura; Toshihiko Ueda, both of Toyokawa; Haruhiro Hyodo; Muneo Kuroda, both of Toyohashi; Akiyoshi Hamada; Hiroaki Nakauchi, both of Toyokawa; Nobuo Kanai, Yawata, all of Japan

[73] Assignee: Minolta Camera Kabushiki Kaisha, Osaka, Japan

[21] Appl. No.: 673,523

[22] Filed: Nov. 20, 1984

[30] Foreign Application Priority Data

| | | | |
|---|---|---|---|
| Nov. 22, 1983 | [JP] | Japan | 58-220065 |
| Nov. 25, 1983 | [JP] | Japan | 58-222876 |
| Nov. 25, 1983 | [JP] | Japan | 58-222877 |
| Nov. 29, 1983 | [JP] | Japan | 58-225880 |
| Nov. 29, 1983 | [JP] | Japan | 58-226404 |

[51] Int. Cl.[4] ........................ G03B 27/68; G03B 27/34; G03B 27/40

[52] U.S. Cl. .......................................... 355/52; 355/8; 355/57

[58] Field of Search ......................... 355/8, 51, 52, 57; 350/6.4

[56] References Cited

U.S. PATENT DOCUMENTS

| | | | |
|---|---|---|---|
| 3,445,161 | 5/1969 | Moss | 355/47 |
| 4,151,563 | 4/1979 | Gast et al. | 355/52 X |
| 4,213,690 | 7/1980 | Sugiura et al. | 355/52 X |
| 4,248,495 | 2/1981 | Minoura | 355/52 X |
| 4,293,184 | 10/1981 | Minoura et al. | 355/52 X |

FOREIGN PATENT DOCUMENTS 53-28087 12/1978 Japan .

*Primary Examiner*—Richard A. Wintercorn
*Attorney, Agent, or Firm*—Price, Gess & Ubell

[57] ABSTRACT

A slit exposure type copying machine capable of copying with anamorphic magnification. The degree of the refractive action of at least one triangular prism is so set as to compensate for the difference between the magnification of projection means and the magnification corresponding to the speed of scanning means.

11 Claims, 41 Drawing Figures

(a) (b)

Fig. 21A
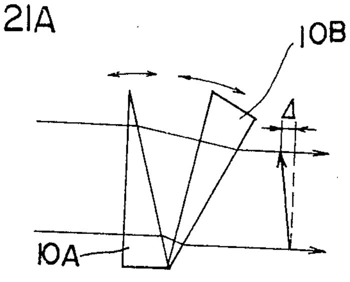
Fig. 21B
Fig. 21C
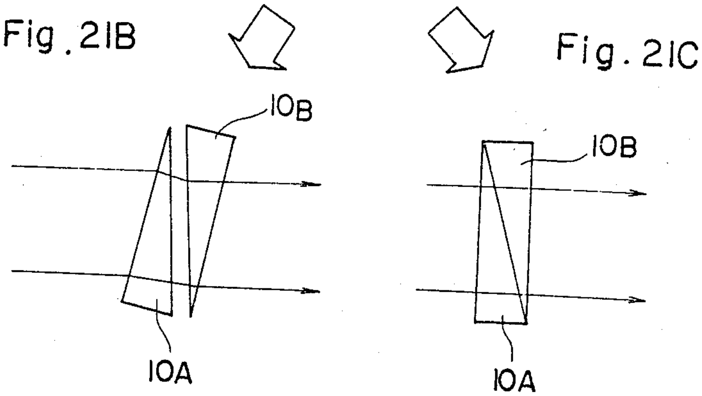
Fig. 22
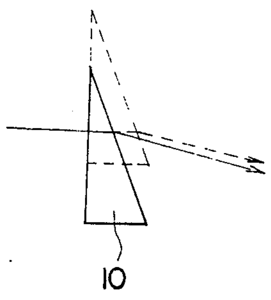

SLIT EXPOSURE TYPE COPYING MACHINE CAPABLE OF COPYING WITH ANAMORPHIC MAGNIFICATION

BACKGROUND OF THE INVENTION

1. Field of the Invention

The present invention relates to a slit exposure type copying machine, and more particularly to such a copying machine for copying with anamorphic magnification wherein the image of an original scanned in the form of a slit by a scanning system is projected on a photosensitive member through a projection lens and at least one triangular prism to form an image on the member.

2. Description of the Prior Art

Copying machines for giving varying copying magnifications are known wherein the projection lens is shifted to the position of magnification of βX, with the scanning speed of the scanning system altered to V/β (V: peripheral speed of the photosensitive member), to thereby obtain a copy at an altered magnification of βX in each of vertical and horizontal directions.

However, copying machines of the type stated for copying anamorphic magnification have been proposed in recent years because they are useful for designing purposes in varying the vertical-to-horizontal ratio of characters and graphic figures, for forming a binding margin along only one vertical or horizontal side of copies or for eliminating defects in copy images when the forced separation method is used.

The term "anamorphic magnification" as herein used refers to a method of copying the image of an original at a different magnification in each of vertical and horizontal directions.

U.S. Pat. No. 3,445,161, for example, discloses a technique for giving a varied vertical-to-horizontal ratio by winding artist's copy and a film around drums and projecting the image of the copy on the film through a lens and a slit while rotating the copy and film drums at different speeds.

With reference to FIG. 33, it is now assumed that an original 2 placed on an original support 11 is to be scanned in the direction of arrow Y along the widthwise direction of a slit 3. For the following description, the widthwise direction of the slit is defined as the direction of arrow R parallel to the scanning direction Y, and the longitudinal direction of the slit as the direction of arrow J perpendicular to the scanning direction Y.

The technique of U.S. Pat. No. 3,445,161 will be applied to an electrophotographic copying machine in the following manner. The image of an original is scanned by a scanning system and then projected by a projection lens on a photosenstive drum rotating at a given speed. For example, the projection lens is brought to the position of magnification of β1X, and the scanning system is set to a scanning speed of V/β1β2. The image then formed on the photosensitive drum has a magnification of β1X in the slit longitudinal direction and a magnification of β1β2X in the slit widthwise direction. The image is developed and transferred to paper to afford a copy of anamorphic magnification.

With the above method, however, the peripheral speed of the photosensitive drum differs from the speed of the image moving on the drum as will be described below, so that the image projected on the drum becomes obscure, hence the drawback of reduced resolving power. In other words, it is impossible to obtain β2X which differs greatly from 1X, such that the β2X actually useful is limited approximately to 1±0.1X.

The reduction of resolving power mentioned will be described with reference to FIG. 1 which shows the operation of a slit exposure type copying system wherein the original is adapted to travel. For giving anamorphic magnification, a projection lens 1 is placed at the position corresponding to a magnification of β1X. An original 2 moves at a speed of V/β1β2 across a slit 3 having a width l. A photosensitive member 4 moves at a speed of V.

Now, the time t taken for a point A on the original 2 to move over the slit 3 is $$t = \frac{l}{V/\beta 1\beta 2} = \frac{\beta 1\beta 2 l}{V}$$

The distance L the photosensitive member 4 moves during the time t is $$L = Vt = \beta 1\beta 2 l$$

During the time t, on the other hand, the point A of the original 2 moves to a point A', and the image formed by the projection lens 1 at the position of magnifiction β1X moves from point B to point B' shown. The amount of movement, L', of the image is $$L' = \beta 1 l$$

Thus, while the point A of the original 2 moves to point A', the image moves from point B to point B', whereas a point C on the photosensitive member 4 moves to point C' ($\overline{CC'}=L$). The difference between the image and the photosensitive member in the amount of movement results in a reduction in resolving power.

Accordingly, if the image is magnified at β2X only in the slit widthwise direction, the amount of movement of the image is $$\beta 2L' = \beta 1\beta 2 l = L$$

Thus, no difference occurs between the two.

Published Examined Japanese Patent Application SHO No. 53-28087 discloses a cylindrical lens disposed in an optical path as means for eliminating the reduction of resolving power and having a refractive power only in the scanning direction. Nevertheless, the elongated cylindrical lens has the drawback of being difficult and costly to fabricate.

SUMMARY OF THE INVENTION

The present invention has been accomplished to overcome all the drawbacks of the conventional techniques described above.

An object of the present invention is to provide a slit exposure type copying machine capable of copying with anamorphic magnification which comprises moving means for moving a photosensitive member past an exposure station at a predetermined speed, means for scanning the image of an original in the form of a slit, projection means for projecting the scanned original image on the photosensitive member at the exposure station to form an image on the member, means for driving the scanning means at a scanning speed corresponding to a magnification different from the magnification of the projection means, and at least one triangular prism disposed in the optical path from the original to the photosensitive member for performing a refractive action only in the scanning direction, wherein the degree of the refractive action is so set as to compensate for the difference between the magnification of the projection means and the magnification corresponding to the speed of the scanning means.

Another object of the present invention is to provide a slit exposure type copying machine capable of copying with anamorphic magnification which comprises moving means for moving a photosensitive member past an exposure station at a predetermined speed, means for scanning the image of an original in the form of a slit at a specified speed, a projection lens for projecting the scanned original image on the photosensitive member at the exposure station to form an image on the member, and at least one triangular prism disposed in an optical path in the vicinity of the projection lens for performing a refractive action only in one direction.

As an advantage of the present invention, the copying machine produces very sharp copy images although the prism gives different copying magnifications in two directions. The present invention has another advantage not only in that the prism is less expensive than other anamorphic means but also in that a desired anamorphic state can be easily selected by varying the number of prisms or by varying the angular position of the prism relative to the projection optical path.

Especially when the prism is in the form of a plate comprising fine prisms, the copying machine has the outstanding advantage that the chromatic aberration and astigmatism involved can be minimized to produce copy images having greatly increased sharpness.

Other objects and advantages of the present invention will become apparent from the following description of embodiments with reference to the accompanying drawings.

BRIEF DESCRIPTION OF THE DRAWINGS

FIGS. 21A to 21C are diagrams showing an embodiment in which two prisms are used for making anamorphic magnification a life-size magnification, i.e. 1X;

FIG. 22 is a diagram illustrating shift of a prism;

DESCRIPTION OF THE PREFERRED EMBODIMENTS

Figure 1:
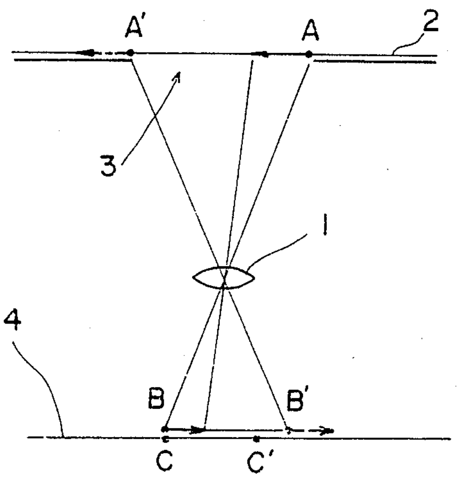
FIG. 1 is a diagram illustrating the operation of an anamorphic arrangement.
Figure 2:
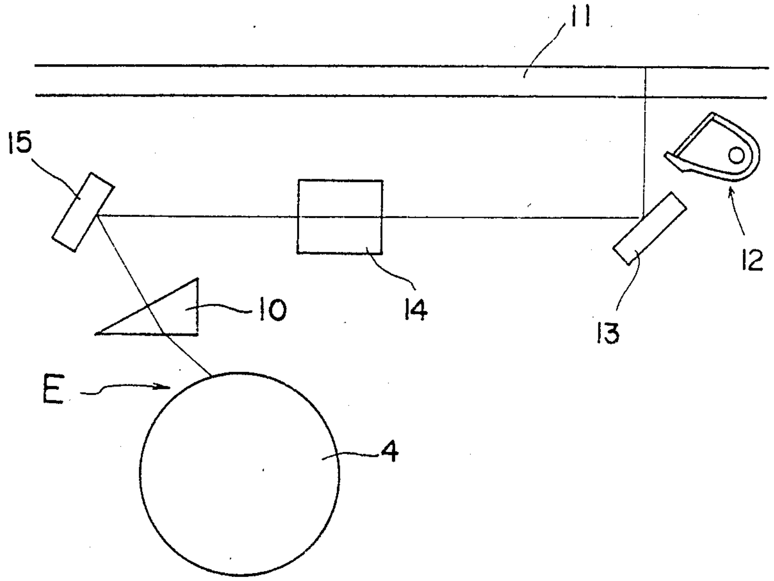
FIG. 2 is a diagram schematically showing an embodiment of copying machine for copying with anamorphic magnification according to the invention.

FIG. 2 schematically shows an embodiment of copying machine of the invention for copying with anamorphic magnification. The machine shown in FIG. 2 has a movable original support 11. The support 11 moves at the speed to be described later with an original placed thereon. The travelling original is illuminated by an illuminating device 12, and the image of the original is transmitted to a photosensitive member 4 at an exposure station E through a first mirror 13, projection lens 14, second mirror 15 and prism 10. The projection lens 14 is movable to the position of a desired magnification. The second mirror 15 is shiftable and deflectable for accommodating a variation in the length of the optical path resulting from the magnification varying movement of the projection lens 14. The mechanisms for moving the projection lens 14 and the second mirror 15 are known and therefore will not be described.

With the present embodiment, the speed of the image to be projected on the photosensitive member 4 is made to match the speed of movement of the member 4 by the action of the prism 10.

The prism 10, which is a single triangular prism, has approximately the same length as the member 4 in its axial direction and is disposed close to the member 4. The prism 10 has no refractive action in the slit lengthwise direction but performs a refractive action on the slit widthwise direction only. The beam emanating from the prism forms an image having a height modified by the refractive action relative to the height of the image before the incidence. Accordingly the prism can be referred to as an optical element which has a magnification only in the direction of the refractive action. According to the present invention, the magnification of the prism in such only one direction will be termed "anamo-magnification" for the sake of convenience. It is to be noted that the term "anamorphic magnification" as herein used includes two magnifications which are different in vertical and horizontal directions.

With the arrangement described above, the position of the projection lens 14 and the scanning speed of the original support 11 are set as listed in Table 1 below in which V is the peripheral speed of the photosensitive member.

TABLE 1

| | Case I | Case II |
|---|---|---|
| Magnification of projection lens | $\beta 1$ | $\beta 1/\beta 2$ |
| Scanning speed | $V/\beta 1\beta 2$ | $V/\beta 1$ |
| Lengthwise magnification | $\beta 1$ | $\beta 1/$ 62 2 |
| Widthwise magnification | $\beta 1\beta 2$ | $\beta 1$ |

When the magnification of projection lens and the scanning speed are set as listed in Table 1, Case I provides an anamorphic magnification of $\beta 1$X in the slit lengthwise direction and $\beta 1\beta 2$X in the slit widthwise direction, while Case II gives an anamorphic magnification of $\beta 1/\beta 2$X in the slit lengthwise direction and $\beta 1$X in the slit widthwise direction, without entailing a reduction in the resolving power. Although the anamo-magnification $\beta 2$ of the prism is fixed according to the present embodiment, the lengthwise magnification or the widthwise magnification can be set to a desired value when the speed control mechanism for the original support and the mechanism for moving the projection lens, etc. are so adapted as to optionally vary the magnification $\beta 1$.

The anamo-magnification $\beta 2$ of the prism provided by its refractive action as described above will be further described with reference to FIGS. 3 to 5.

Figure 3:
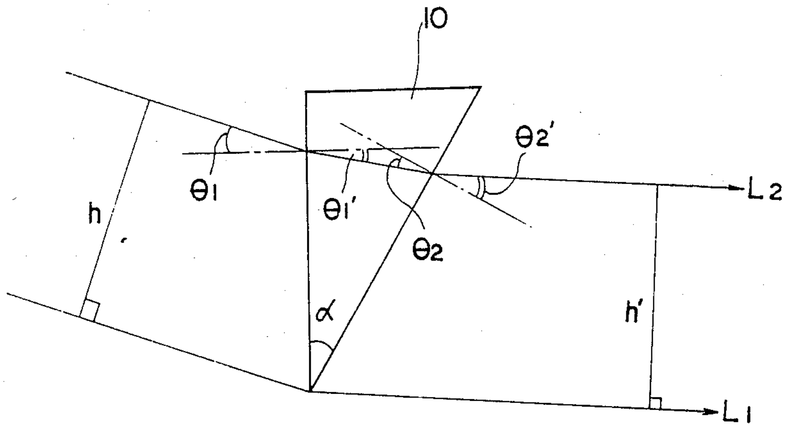
FIGS. 3 to 5 are illustrative diagrams for calculating the magnification to be given by the refractive action of a single triangular prism.
Figure 4:
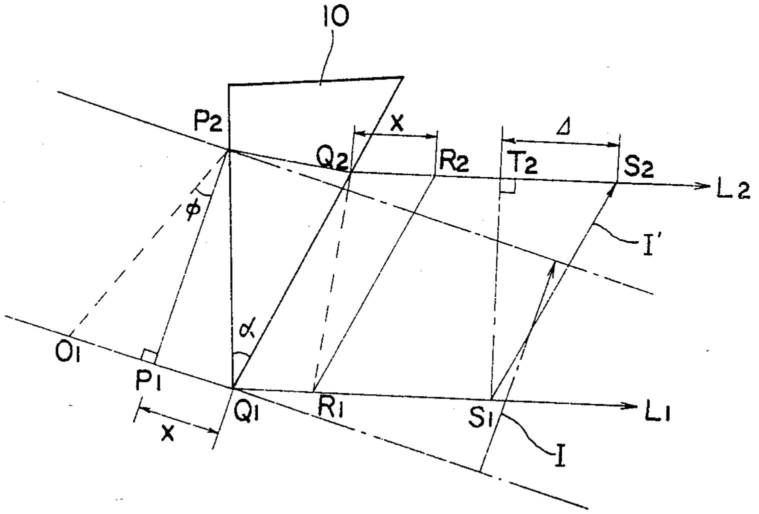

FIG. 3 shows two parallel main rays L1 and L2 spaced by a distance h and incident on a triangular prism 10 at an angle $\theta 1$. Principal rays L1 and L2 advance as refracted as shown. The principal rays are those of image forming beams for two image points. Principal rays only will be used herein for describing the magnification of image. In this case, there is the following relationship according to Snell's law.

$$\sin\theta 1 = n\sin\theta 1' \tag{1}$$

$$\theta 2 = \alpha - \theta 1' \tag{2}$$

$$n\sin\theta 2 = \sin\theta 2' \tag{3}$$

$$h' = \frac{\cos\theta 1'\cos\theta 2'}{\cos\theta 1\cos\theta 2}\,h \tag{4}$$

wherein n: refractive index of the prism
$\alpha$: vertex angle of the prism
$\theta 1$: angle of incidence on the first surface
$\theta 1'$: angle of refraction at the first surface
$\theta 2$: angle of incidence on the second surface
$\theta 2'$: angle of refraction at the second surface
h': spacing between the emerging principal rays FIG. 4 shows an image forming position I when the prism is absent. When the light forming the image I perpendicular to the principal rays is incident on the prism 10 based on the above relationship in this case, the principal rays L1, L2 pass through the optical paths of P1→Q1→R1→S1 and P2→Q2→R2→S2, respectively, to form an image I'.

The rays passing through a substance having a refractive index n have a farther image forming point than those passing through air. Based on the relation of equivalent optical path length involved, $\overline{Q1R1}$ is selected as given below.

$$\overline{Q1R1} = \overline{P2Q2}/n \tag{5}$$

Accordingly $\overline{P1Q1} = x = \overline{Q2R2}$, the equivalent optical path length P1Q1R1 on principal ray L1 matches like length P2Q2R2 on principal ray L2. Thus, after passing through the prism, R1R2 plane is in equidistance (equivalent optical path length) relation with P1P2 plane.

Now, the deflection of the direction of advance of the principal ray on the principal rays L1 and L2 is assumed to be $\Delta$. The magnification $\beta 2$ given by the prism 10 is then $$\beta 2 = \frac{\sqrt{h'^2 + \Delta^2}}{h} \tag{6}$$

Figure 5:
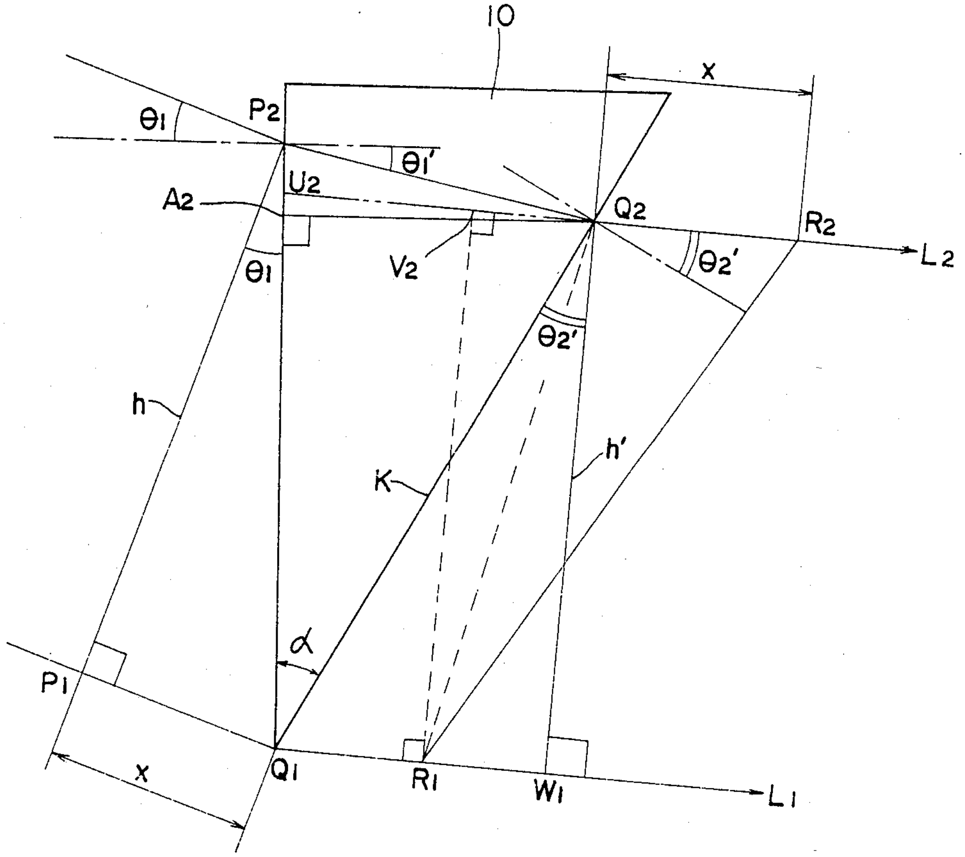

Next with reference to FIG. 5, the line of principal ray L2 after passing through the prism is extended into the prism. Suppose the extension has a point of intersection U2 with the first surface of the prism, and a perpendicular drawn from point R1 to the extension has a foot V2. Since $\Delta$S1S2T2 of FIG. 4 is similar to $\Delta$R1R2V2 in FIG. 5, $$\Delta = x = \overline{Q2V2} \tag{7}$$

Further from $\Delta$P1P2Q1, $$x = h\tan\theta 1 \tag{8}$$

When it is assumed that the foot of a perpendicular drawn from point Q2 to principal ray L1 after passing through the prism is W1, $$\overline{Q2V2} = \overline{R1W1} = \overline{Q1W1} - \overline{Q1R1} \tag{9}$$

From $\Delta$Q1Q2W1, $\overline{Q1W1}$ is given by $$\overline{Q1W1} = h'\tan\theta 2'$$

Further from Equation (4), $$\overline{Q1W1} = h\,\frac{\cos\theta 1'\sin\theta 2'}{\cos\theta 1\cos\theta 2} \tag{10}$$

Because $\overline{Q1R1}$ has the relationship of Equation (5), $\overline{P2Q2}$ can be determined as follows from $\Delta$Q1Q2A2 and $\Delta$P2Q2A2, assuming that $\overline{Q1Q2}$=k and that the foot of a perpendicular drawn from point Q2 to the first plane of the prism is A2.

$$\overline{P2Q2} = k\,\frac{\sin\alpha}{\cos\theta 1'}$$

From k which can be expressed as $h'/\cos\theta 2'$ and also from Equation (4), $$\overline{P2Q2} = h\frac{\sin\alpha}{\cos\theta 1\,\cos\theta 2} \quad (11)$$

From Equations (4), (7), (8), (9), (10) and (11), $\beta 2$ of Equation (6) is given by $$\beta 2 = \frac{\sqrt{(\cos\theta 1'\,\cos\theta 2')^2 + \left(\frac{n^2-1}{n}\sin\alpha\right)^2}}{\cos\theta 1\,\cos\theta 2} \quad (12)$$

In Equation (12), $\theta 1'$, $\theta 2$ and $\theta 2'$ can be converted to a function of $\theta 1$ from the relationship of Equations (1) to (3). Accordingly the anamo-magnification $\beta 2$ can be determined as desired by suitably setting the angle of incidence $\theta 1$ on the prism, the vertex angle $\alpha$ of the prism and the refractive index n of the prism.

In the foregoing description, the two principal rays are assumed to be parallel for a simplied description. In a general case wherein the rays are not parallel, the prism similarly produces a varied magnification, which can be determined of course based on the above concept.

Further the image before incidence on the prism has been handled as being perpendicular to the principal rays, but the magnification can be similarly determined also when the image is not perpendicular to the principal rays. If the image is inclined at an angle of $\phi$ as indicated in a broken line O1P2 in FIG. 4, Equation (12) is modified as follows.

$$\beta 2' = \frac{\sqrt{(\cos\theta 1'\,\cos\theta 2')^2 + \left(\frac{n^2-1}{n}\sin\alpha + \tan\phi\right)^2}}{\cos\theta 1\,\cos\theta 2}\cos\phi \quad (12)'$$

Figure 6:
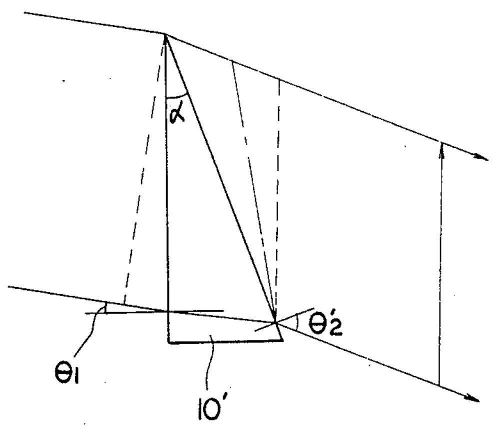
FIGS. 6 and 7 are diagrams each showing a prism usable for the embodiment of FIG. 2.

Next, examples of prisms usable for the embodiment of FIG. 2 will be described. FIG. 6 shows a prism 10' for obtaining $\beta 2$ which is 0.89 X. In this case, $\theta 1 = -10°, \alpha = 20°$ and n=1.5168.

Figure 7:
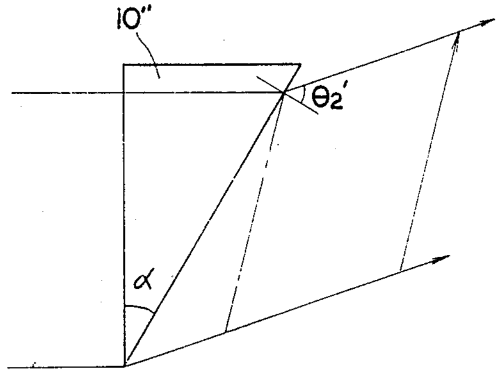

FIG. 7 shows a prism 10'' for giving $\beta 2$ which is 0.9X. In this case, $\theta = 0°$, $\alpha = 30°$ and n=1.5168.

Further in FIGS. 6 and 7, the prism 10' or 10'' may be rotated about an axis parallel to the slit lengthwise direction and brought into a reverse incidence-emergence relationship to the original. In the case of FIG. 6, $\beta 2$ is then 1/0.89, i.e. 1.12X. At this time, the angle of incidence is $\theta 1 = 30°$. Similarly in the case of FIG. 7, $\beta 2 = 1/0.9 = 1.11$X, and angle of incidence is $\theta 1 = 49°$. In these cases, the image before the incidence on the prism is not perpendicular to the principal rays.

Figure 8:
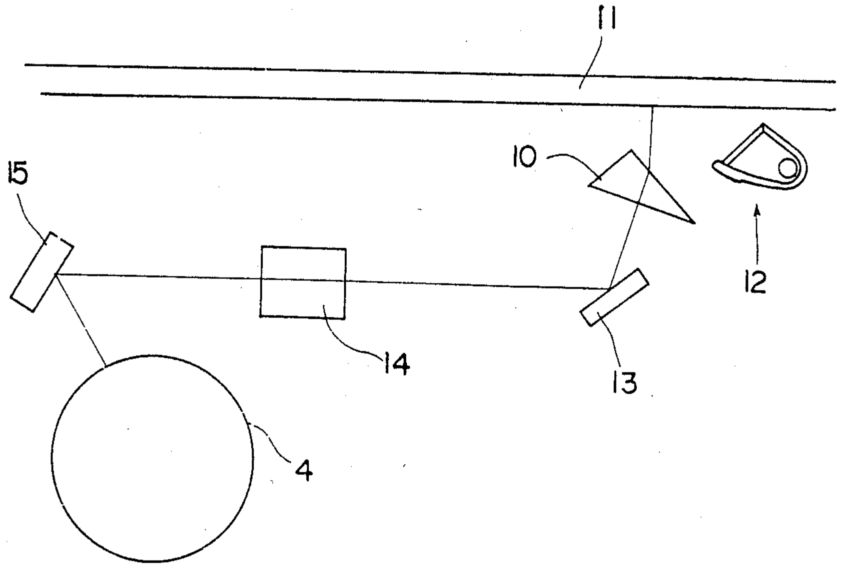
FIG. 8 is a diagram showing a modification of FIG. 2.

With the anamorphic copying machine of the present invention, the prism 10 may be disposed at any location in the optical path. Whereas the prism 10 is disposed on one side of the projection lens 14 in FIG. 2, the prism is disposed on the other side of the lens toward the original according to the embodiment of FIG. 8.

Figure 9:
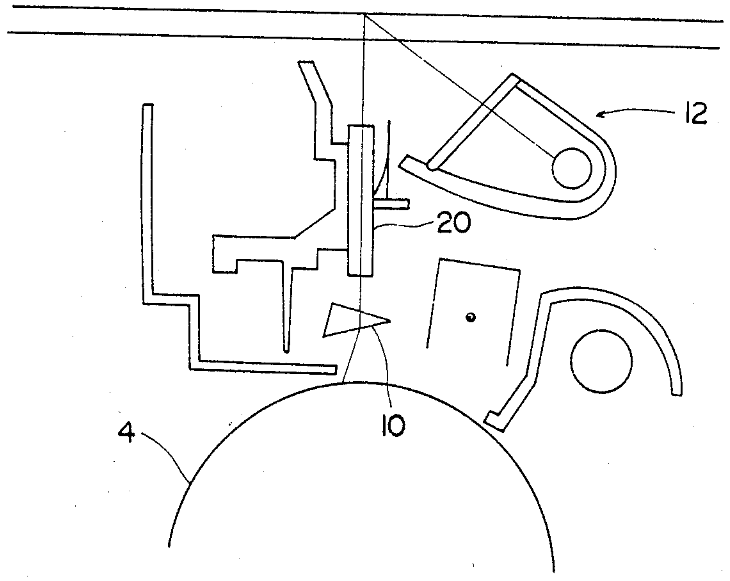
FIG. 9 is a diagram showing another copying machine incorporating a single prism.

FIG. 9 shows an embodiment incorporating a bundle 20 of optical fibers having graded refractive indexes as a projection optical system. This embodiment, in which the bundle 20 has a fixed magnification, affords anamorphic magnigication according to Case I.

When copying machines including the above anamorphic magnification mechanism are to be used in the usual mangification varying mode, the prism is retracted from the optical path, and the variation in the length of the optical path and the inclination of the path are corrected. Alternatively, the prism is rotated to set the magnification provided by the prism to 1X.

Figure 10:
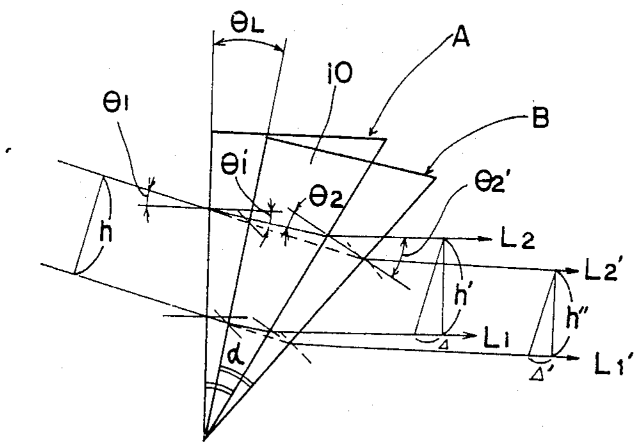
FIG. 10 is a diagram illustrating a case wherein a prism is rotated to vary anamorphic magnification.

Next, an embodiment will be described which includes at least one prism 10 as in FIG. 2 and means for varying the angle of incidence of a beam on the prism 10. The anamomagnification $\beta 2$ of the prism is varied by varying the angle of incidence on the prism by one of the following two means which are relatively the same. The first is means for rotating the prism itself about an axis parallel to the slit as schematically shown in FIG. 10. With reference to FIG. 10, the prism 10 is rotated from position A to position B through an angle $\theta$L. The angle of incidence $\theta$1a at the position A and the angle of incidence $\theta$1b at the position B then have the following relationship therebetween. The angle in a counterclockwise direction is assumed to be positive.

$$\theta 1b = \theta 1a - \theta L \quad (13)$$

This equation and Equations (1) to (3) give $\theta$1b', $\theta$2b and $\theta$2b' when the initial angle of incidence $\theta$1a and the angle of rotation $\theta$L are given. Substitution of these values in Equation (12) or (12)' affords the magnification $\beta$2b at the position B. Preferably the center of rotation is so selected as to minimize the displacement of the image forming position, inclination of image and variation in the length of the optical path due to the rotation.

Figure 11:
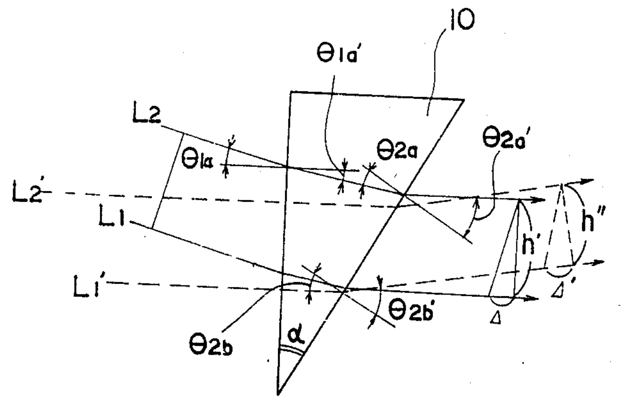
FIG. 11 is a diagram illustrating a case wherein the angle of incidence of light on the prism is altered to vary anamorphic magnification.

The second means is adapted to vary the angle of incidence by shifting the optical path for the beam incident on the prism, with the prism 10 in fixed position, as schematically shown in FIG. 11. For a simplified description, FIG. 11 shows that the shifted optical path or principal rays L1', L2' are incident on the prism perpendicular thereto.

The optical path is thus shifted by pivotally and otherwise moving a front reflecting system, e.g. the second mirror 15 in FIG. 2. Preferably such movement is also so effected as to minimize the displacement of the image forming position, inclination of image and variation in the length of the optical path.

Of course, it is possible to use the foregoing first and second means in combination.

Since these first and second means are relatively the same, variations in the magnification $\beta 2$ resulting from variations in the angle of incidence $\theta 1$ are given in Table 1, in which a prism I has a vertex angle of 30° and a prism II has a vertex angle of 15°. The two prisms have a refractive index n of 1.5168.

TABLE 2

| Angle of incidence $\theta 1$ | Magnification $\beta 2$ Prism I | Magnification $\beta 2$ Prism II |
|---|---|---|
| −15 | 0.66 | 0.86 |
| −10 | 0.76 | 0.90 |
| −5 | 0.84 | 0.93 |
| 0 | 0.90 | 0.95 |
| 5 | 0.95 | 0.97 |
| 10 | 1.00 | 0.99 |
| 15 | 1.04 | 1.00 |
| 20 | 1.08 | 1.03 |
| 25 | 1.13 | 1.05 |
| 30 | 1.18 | 1.08 |

Figure 12:
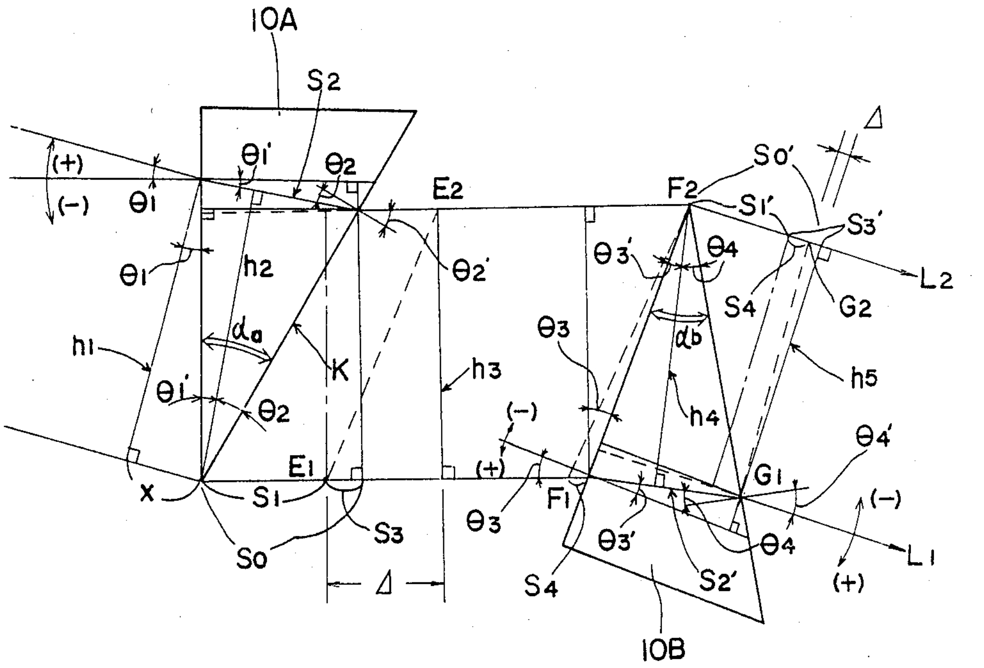
FIG. 12 is a diagram illustrating a case wherein two prisms are used.

The embodiments described comprise a single prism, whereas use of two prisms is advantageous in various aspects. Stated more specifically, a single prism permits occurrence of chromatic aberration and astigmatism and forms a greatly inclined image, but astigmatism can be diminished with use of two prisms having a smaller vertex angle than the single prism. Further two prisms can be arranged with their vertex angles oriented in opposite directions for each to offset the chromatic aberration and inclination of image of the other. FIG. 12 shows a case wherein two prisms 10A and 10B are used. Indicated at h1 is the distance between the principal rays before incidence on the prism 10A, at h2 the distance between the principal rays within the prism 10A, at h3 the corresponding ray-to-ray distance between the two prisms 10A and 10B, at h4 the distance between the principal rays within the prism 10B, and at h5 the distance between the principal rays emerging from the prism 10B. These ray-to-ray distances have the following relationships therebetween. The angle of incidence, angle of refraction and vertex angle of each prism satisfy the relationship of Equations (1) to (3).

$$\left.\begin{array}{ll} h2 = h1\dfrac{\cos\theta 1'}{\cos\theta 1} & h3 = h2\dfrac{\cos\theta 2'}{\cos\theta 2} \\ h4 = h3\dfrac{\cos\theta 3'}{\cos\theta 3} & h5 = h4\dfrac{\cos\theta 4'}{\cos\theta 4} \end{array}\right\} \quad (14)$$

When h5 is determined from Equations (14) and assuming that the displacement of the principal rays emerging from the prism 10B is Δ', the eventual magnification *β*20 is given by $$\beta 20 = \frac{\sqrt{h5^2 + \Delta'^2}}{h1} \quad (15)$$

The displacement of principal rays, Δ', can be determined in the same manner as in the foregoing case of single prism. The broken lines $\overline{E1E2}$, $\overline{F1F2}$ and $\overline{G1G2}$ shown represent inclinations of the image. It is seen that the eventual inclination of the image is much smaller than is the case with a single prism.

More specifically the inclination of image is obtained in the following manner. With reference to FIG. 3, it is assumed that the deflection angle of angle of emergence relative to the angle of incidence is ε. Then this angle is given by $$\epsilon = \theta 1 \cdot \theta 2' - \alpha$$

On the other hand, when the inclination angle of the image surface relative to the principal rays is ω, $$\omega = \tan^{-1}\frac{\Delta}{h'}$$

Accordingly the inclination angle η of the image surface after passing through the prism relative to the image surface before passing through the prism is $$\eta = \epsilon - \omega = \theta 1 + \theta 2' - \alpha - \tan^{-1}\frac{\Delta}{h'}$$

By repeating this a number of times equal to the number of prisms, the eventual inclination angle of the image surface can be obtained.

The system of a plurality of prisms is advantageous over a single prism in that the former is smaller in the inclination of image surface as described above and is further lesser in astigmatism and chromatic aberration.

Next, astigmatism will be described. Astigmatism is the phenomenon that light emanating from a point light fails to form an image at one point when passing through an image forming optical system. This occurs because the meridional beam and the sagittal beam converge at different points. The difference between the points of convergence of the two beams is termed astigmatic difference.

Figure 23:
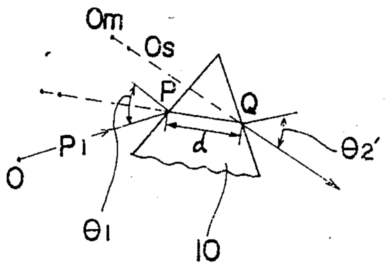
FIG. 23 is a diagram illustrating astigmatism of a prism.
Figure 25:
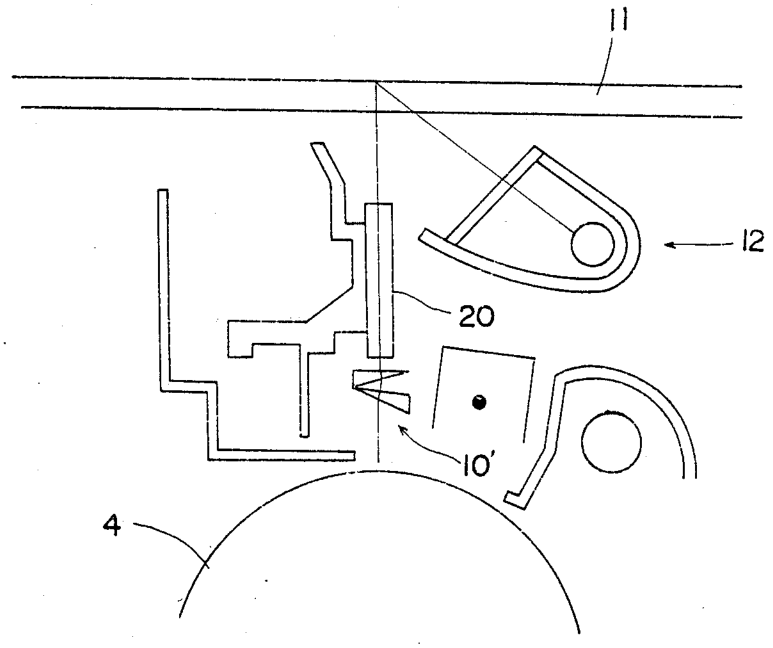
FIG. 25 is a diagram showing another copying machine incorporating the two-prism system.

With reference to FIG. 23, suppose light from a light source O advances as refracted at points P and Q. Further suppose the virtual points of convergence of the meridional beam and sagittal beam refracted at Q are Om and Os, respectively, $\overline{OP}$=P1 and $\overline{PQ}$=d. The distances from Q to the points of convergence of the meridional beam and sagittal beam are $$\overline{QOm} = Pm = \frac{\cos^2\theta 2}{\cos^2\theta 2'}\left(\frac{\cos^2\theta 1}{\cos^2\theta 1'}P1 - \frac{d}{n}\right) \quad (16)$$

$$\overline{QOs} = Ps = P1 - \frac{d}{n} \quad (17)$$

Accordingly the astigmatic difference ΔP is $$\Delta P = \frac{d}{n}\left(1 - \frac{\cos^2\theta 2}{\cos^2\theta 2'}\right) - P1\left(1 - \frac{\cos^2\theta 1\cos^2\theta 2}{\cos^2\theta 1'\cos^2\theta 1'}\right) \quad (18)$$

For details of this calculation, refer to Hiroshi Kubota, "Kohgaku (Optics)," Iwanami-shoten, Japan.

Now with reference to Equation (18), a single prism and a two-prism system will be compared when giving the same magnification. With the two-prism system, the angle of incidence and the angle of refraction at the planes concerned can be smaller than is the case with the single prism. Accordingly the cosine terms of Equation (18) are approximate to 1, with the result that ΔP is small.

Further it is noted that chromatic aberration is a dispersion phenomenon resulting from the fact that the refractive index differs for different wavelengths. When two prisms are so arranged that their vertex angles are oriented in opposite directions as seen in FIG. 12, the rays of different wavelengths are dispersed by the first prism and then dispersed by the second prism in opposite direction, so that the rays are consequently converged. Thus, chromatic aberration can be made smaller by the two-prism system.

As described above, the system of a plurality of prisms has the advantage over single prisms that it is lesser in the inclination of image surface, astigmatism and chromatic aberration.

Figure 24:
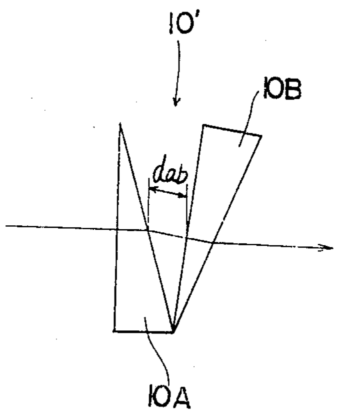
FIG. 24 is a diagram showing an example of two-prism system.

Next, a preferred embodiment of system of plural prisms will be described. FIG. 24 shows an arrangement of two prisms 10A and 10B having a vertex angle of 15° for giving a magnification of 0.9X. The angle of incidence on the first surface of each prism is 0°. Now, Pm and Ps of Equations (16) and (17) for the prisms 10A and 10B will be represented by these symbols with the adscripts of a and b. Suppose the thicknesses of the prisms through which the beam passes are da, db, the prism-to-prism distance the beam passes is dab, and the refractive index is 1.5. From Equations (16), (17) and (18), $$Pma = \frac{\cos^2\theta 2}{\cos^2\theta 2'}\left(\frac{\cos^2\theta 1}{\cos^2\theta 1'}P1 - \frac{da}{1.5}\right) = 1.1\left(P1 - \frac{da}{1.5}\right)$$

-continued $$Psa = Pl - \frac{da}{1.5}$$

For the beam passing through the prism 10B after passing through the prism 10A, $$Pmb = \frac{\cos^2\theta 2}{\cos^2\theta 2'}\left\{\frac{\cos^2\theta 1}{\cos^2\theta 1'}(Pma - dab) - \frac{db}{1.5}\right\}$$

$$= 1.2Pl - 0.8da - 0.73db - 1.1dab$$

$$Psb = (Psa - dab) - \frac{db}{1.5}$$

$$= Pl - \frac{da}{1.5} - \frac{db}{1.5} - dab$$

Accordingly the astigmatic difference ΔP is $$\Delta P = Pmb - Psb = 0.2Pl - (0.13da + 0.06db + 0.1dab)$$

Now, suppose Pl=10 mm, da=2.57 mm and a beam passes through the prisms toward one end of the prism 10A opposite to its vertex angle for the sake of simplicity. dab and db are then smaller than da, so that ΔP at this time is $$\Delta P \simeq 1.7$$

For comparison, a case is considered in which a a single prism having a vertex angle of 30° and a refractive index of 1.5 is used, and a beam is made incident on the first surface thereof perpendicular thereto to give a magnification of 0.9. When Pl=10 mm as in the above case, ΔP' obtained is $$\Delta P' \simeq 7.1$$

Apparently the two-prism system is smaller in astigmatic difference than the single prism.

Figure 13:
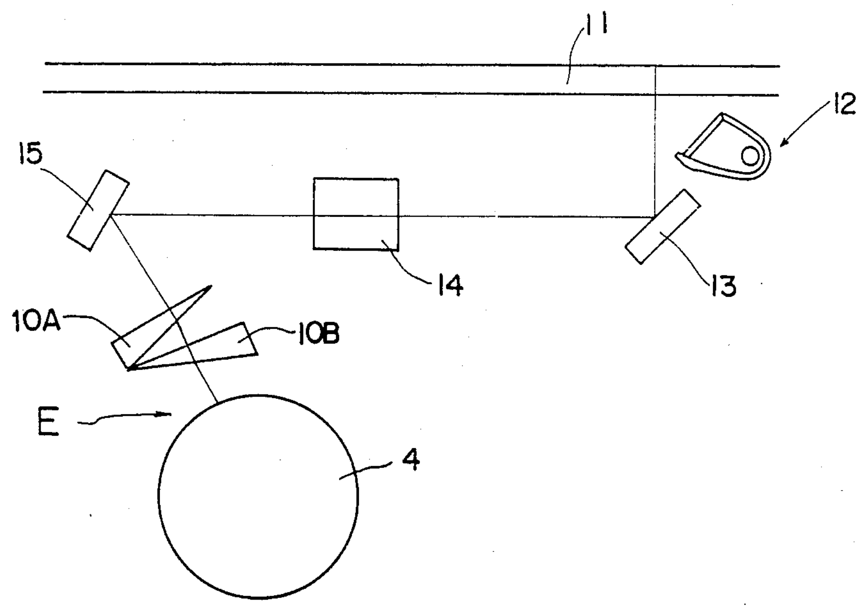
FIGS. 13 to 15 are diagrams showing other embodiments of copying machines incorporating two prisms for copying with anamorphic magnification.
Figure 14:
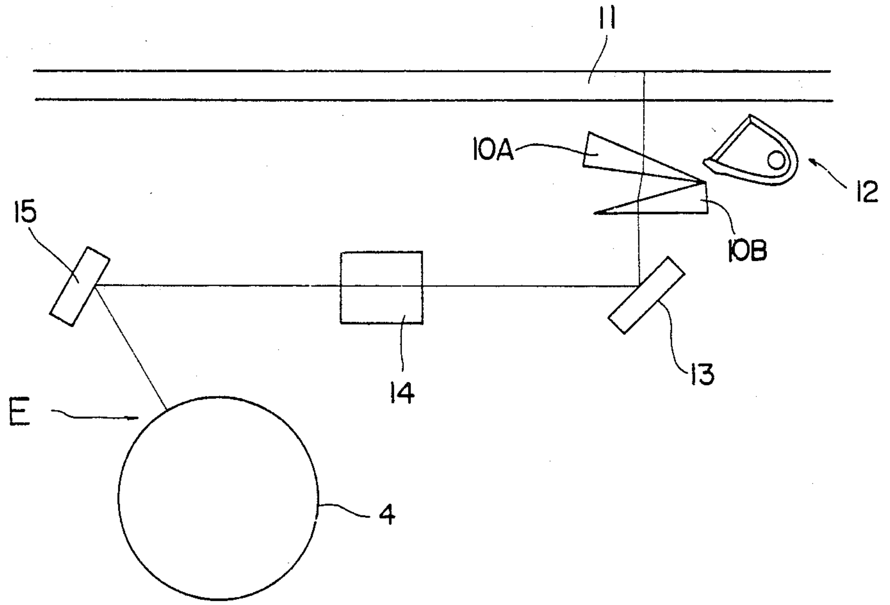
Figure 15:
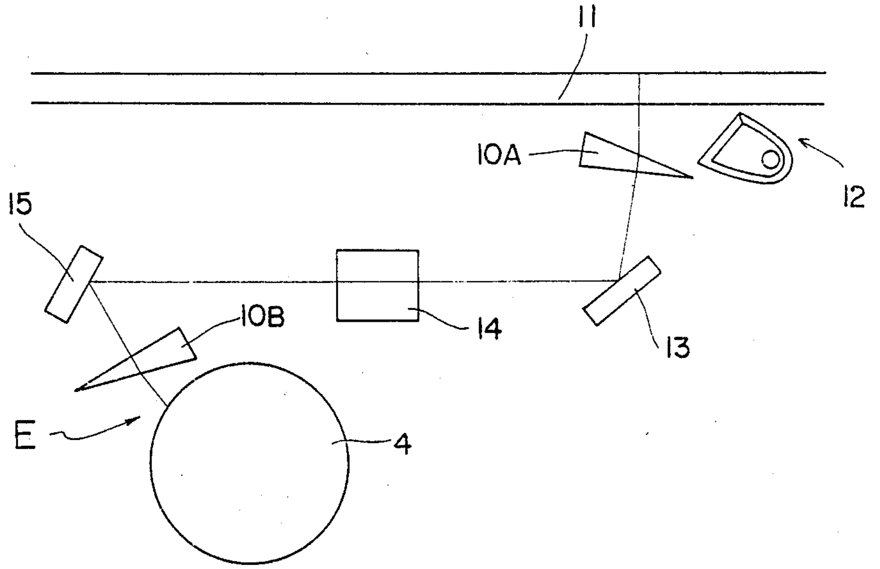

FIGS. 13 to 15 show embodiments having the same construction as the one shown in FIG. 2 except that such two prisms are arranged within the copying machine.

When these two prisms are used, the anamo-magnification can be varied in the following manner.

| | Prism 10A | Prism 10B |
|---|---|---|
| (i) | Fixing | Rotating |
| (ii) | Rotating | Fixing |
| (iii) | Rotating | Rotating |
| (iv) | Fixing | Varying angle of incidence |
| (v) | Varying angle of incidence | Fixing |
| (vi) | Varying angle of incidence | Varying angle of incidence |

"Varying angle of incidence" in (iv), (v) and (vi) means that the path for the beam to be incident on the prism concerned is shifted with the prism fixed. Since this is substantially difficult with the systems of FIGS. 13 and 14 wherein the two prisms are closely arranged, this method may be used for the arrangement of FIG. 15 wherein the two prisms are away from each other. In FIG. 15, the prism 10A is interposed between the original support 11 and the first mirror 13, and the prism 10B between the second mirror 15 and the photosensitive member 4.

(i) and (ii), (iii) and (iv), and (v) and (vi) can be regarded as relatively the same condition.

Listed below are magnifications β2 and angles of inclination of image, θG, when the vertex angles of the prisms 10A, 10B and the angle of incidence on the prism 10A are predetermined, and the angle of incidence θ3 on the prism 10B is varied by rotating the prism 10B. The angle of inclination of an image, θG, is the angle formed between the image before incidence on a prism and the image emerging from the prism. With reference to FIG. 12, the angle between $\overline{E1E2}$ and $\overline{G1G2}$ is this angle.

TABLE 3

| θ3 | β2 | θG | |
|---|---|---|---|
| −15 | 0.30 | −2.66 | Vertex angle of prism 10A: 30° |
| −10 | 0.50 | −4.76 | Vertex angle of prism 10B: 30° |
| −5 | 0.62 | −4.45 | Angle of incidence on prism 10A: 15° |
| 0 | 0.70 | −3.96 | Angle of emergence from prism 10A: 31.54° |
| 5 | 0.76 | −3.44 | |
| 10 | 0.81 | −2.90 | |
| 15 | 0.86 | −2.33 | |
| 20 | 0.90 | −1.71 | |
| 25 | 0.94 | −1.02 | |
| 30 | 0.99 | −0.25 | |

TABLE 4

| θ3 | β2 | θG | |
|---|---|---|---|
| −15 | 0.86 | −0.13 | Vertex angle of prism 10A: 15° |
| −10 | 0.90 | −0.22 | Vertex angle of prism 10B: 15° |
| −5 | 0.92 | −0.25 | Angle of incidence on prism 10A: 10° |
| 0 | 0.95 | −0.23 | Angle of emergence from prism 10A: 12.85° |
| 5 | 0.97 | −0.18 | |
| 10 | 0.98 | −0.08 | |
| 15 | 1.00 | 0.07 | |
| 20 | 1.03 | 0.25 | |
| 25 | 1.05 | 0.48 | |
| 30 | 1.08 | 0.76 | |

TABLE 5

| θ3 | β2 | θG | |
|---|---|---|---|
| −15 | 0.88 | −0.01 | Vertex angle of prism 10A: 15° |
| −10 | 0.91 | −0.08 | Vertex angle of prism 10B: 15° |
| −5 | 0.94 | −1.20 | Angle of incidence on prism 10A: 15° |
| 0 | 0.97 | −1.07 | Angle of emergence from prism 10A: 7.86° |
| 5 | 0.99 | −0.05 | |
| 10 | 1.01 | 0.05 | |
| 15 | 1.03 | 0.19 | |
| 20 | 1.05 | 0.37 | |
| 25 | 1.07 | 0.60 | |
| 30 | 1.10 | 0.87 | |

TABLE 6

| θ3 | β2 | θG | |
|---|---|---|---|
| −15 | 0.82 | 0.45 | Vertex angle of prism 10A: 14° |
| −10 | 0.85 | 0.30 | Vertex angle of prism 10B: 16° |
| −5 | 0.88 | 0.22 | Angle of incidence on prism 10A: 0° |
| 0 | 0.91 | 0.20 | Angle of emergence from prism 10A: 21.53° |
| 5 | 0.93 | 0.23 | |
| 10 | 0.95 | 0.32 | |
| 15 | 0.97 | 0.45 | |
| 20 | 0.99 | 0.62 | |
| 25 | 1.02 | 0.84 | |
| 30 | 1.04 | 1.11 | |

The data listed above reveals the tendency that the magnification increases with an increase in the vertex angle of the prism and also with an increase in the angle of incidence. When two prisms are used, a greater magnification is obtained when the vertex angle of the rear prism is larger than that of the front prism.

Thus according to the present embodiment, the anamorphic magnification provided by one or at least two prisms is varied by altering the relative angle of incidence of light on the prism. In practice, it is advantageous in respect of precision and cost to consider a combination of several expedients, such as positioning the eventual image in parallel with the object plane, use of a plurality of prisms having the same vertex angle and setting the angle of incidence to 0°.

With reference again to Equations (12) and (12)′, it is seen that the anamo-magnification is variable also by altering the vertex angle, i.e. by selectively positioning one of a plurality of prisms having different vertex angles in the optical path. Furthermore, the magnification is variable by selectively using one of a plurality of prism systems which are different in vertex angle and the relative angle of incidence on which is variable.

Figure 16:
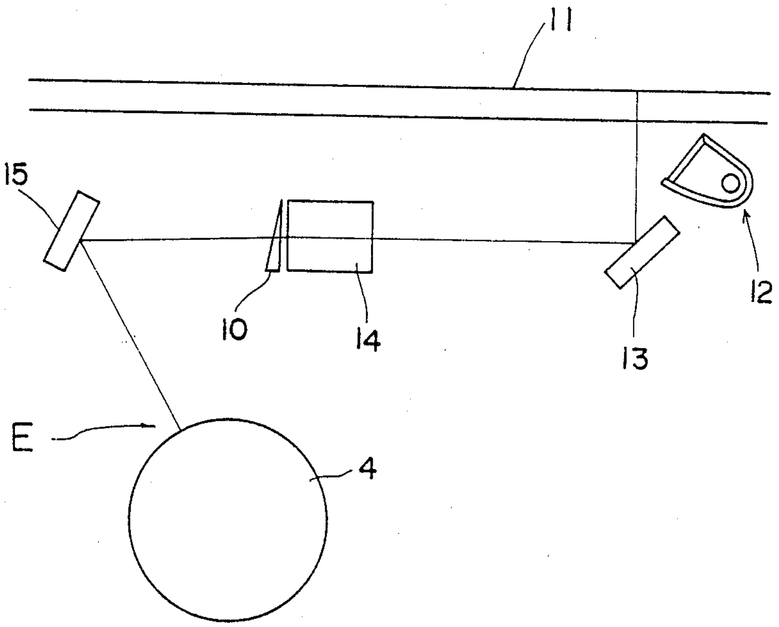
FIG. 16 is a diagram showing an embodiment wherein a prism is disposed in the vicinity of a projection lens.

FIG. 16 schematically shows an embodiment of anamorphic copying machine wherein a prism 10 is disposed in the vicinity of a projection lens 14. Like the copying machine shown in FIG. 2, this machine comprises an illuminating device 12 for illuminating originals, first mirror 13, projection lens 14, prism 10, second mirror 15 and a photosensitive member 4 at an exposure station E. This machine differs from the one shown in FIG. 2 in that the prism 10 is disposed in the vicinity of the projection lens in the optical path of projection. The prism 10 has nearly the same size as the projection lens 14, has no refractive action in the slit lengthwise direction but performs a refractive action only in the slit widthwise direction to give an anamo-magnification of $\beta 2$. When so positioned as stated above, the prism can be of a greatly reduced size which is approximately the size of the projection lens.

With the arrangement described, the magnification $\beta 2$ of the prism can be determined in exactly the same manner as described for the embodiment of FIG. 2. Thus the magnification can be calculated from Equation (12) when the image before the incidence on the prism is perpendicular to the principal rays, or from Equation (12)′ when the image before incidence is not perpendicular to the principal rays but is inclined at an angle $\psi$.

Figure 17A:
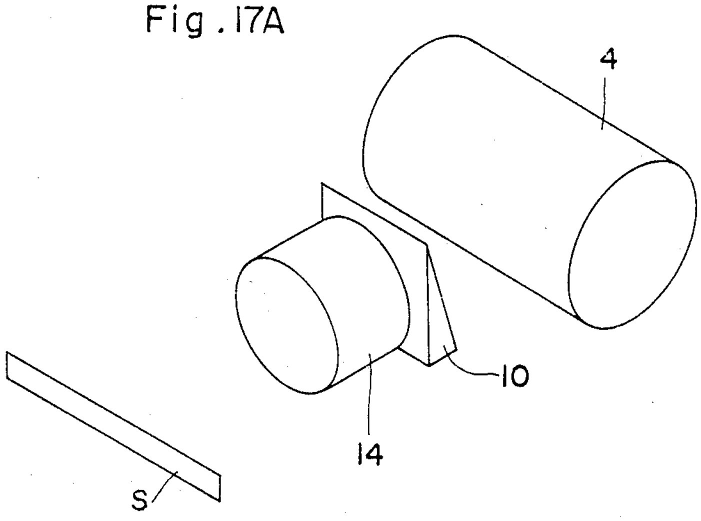
FIGS. 17A and 17B are perspective views schematically showing an embodiment wherein a prism is rotatable about the optical axis of a projection lens.
Figure 17B:
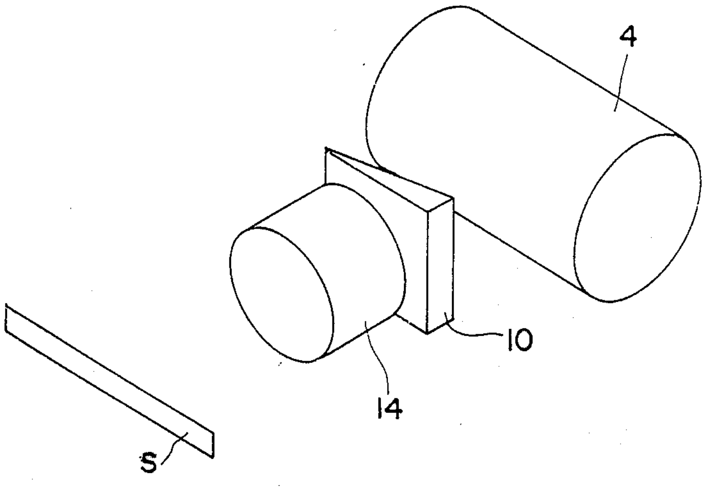

From a different viewpoint, the present embodiment, in which the prism is disposed in the vicinity of the projection lens, gives anamorphic magnification with greater ease, i.e. by rotating the prism through 90° about the optical axis of the projection lens. FIG. 17A shows an arrangement corresponding to FIG. 16. A slit illumination zone S is shown, with the first, second mirrors, etc. omitted. FIG. 17B shows the same arrangement, in which the prism 10 has been rotated through 90° from the position in FIG. 17A. In the state of FIG. 17B, the prism performs a refractive action in the slit lengthwise direction but no refractive action in the slit widthwise direction. In this case, in the slit widthwise direction, the absence of refractive action produces no vairation in magnification and therefore no reduction in resolving power, so that the scanning speed is in the usual relationship with the projection lens. Stated more specifically, if the projection lens in the position of magnification $\beta 1$, the scanning speed is $V/\beta 1$, making it possible to obtain copies which have a magnification of $\beta 1\beta 2X$ in the slit lengthwise direction and a magnification of $\beta 1X$ in the slit widthwise direction. Since the position of the projection lens is related to the scanning speed for the usual mode of magnification variation, the arrangement can be adapted for anamorphic magnification with ease.

Figure 18:
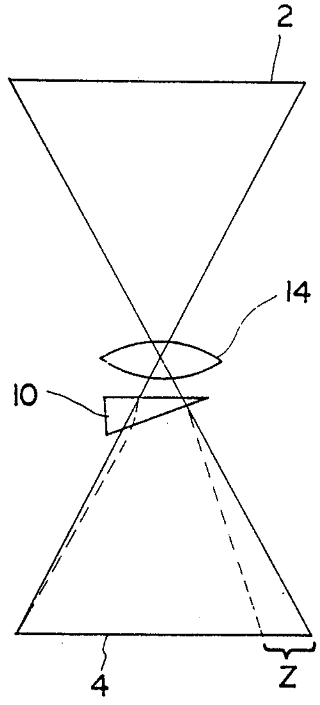
FIG. 18 is a development of an optical path showing deflection of an image in the case of FIG. 17B.

Further in the case of FIG. 17B, the image is deviated toward one side axially of the photosensitive member. This is illustrated in FIG. 18 which is a development of the optical path. Accordingly the arrangement is advantageous for simple uses for forming a binding margin or forming a blank area for forced separation.

Figure 19:
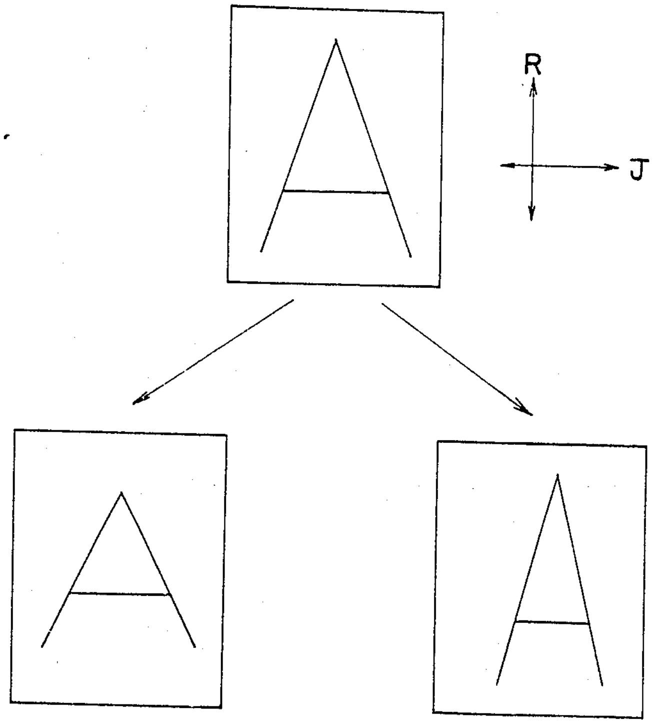
FIG. 19 is a diagram showing copies obtained by the embodiment of FIG. 17B with anamorphic magnifications.

The arrangement wherein the prism is rotatable about the optical axis of the projection lens so as to be selectively positioned in the state of FIG. 17A or 17B has another advantage. In the case of reduced anamorphic magnification, Case I or Case II (FIG. 19 (*a*)) in Table 1 is selectable when it is desired to obtain copies which are on a reduced scale in the slit widthwise direction. Further when it is desired to obtain copies which are on a reduced scale in the slit lengthwise direction, with the copy image deviated toward one side in the slit lengthwise direction (FIG. 19 (*b*)), the state of FIG. 17B is to be selected. Thus the arrangement is suited for such selective use. When the prism is made reversibly rotatable, the image can be deviated selectively toward either side of paper.

In the present embodiment wherein the prism is disposed close to the projection lens, the prism itself can be made rotatable about an axis parallel to the slit lengthwise direction to provide an altered anamo-magnification. Preferably the axis of rotation is so selected as to minimize the deviation of image forming position, inclination of image and variation in the length of the optical path due to the rotation.

The above magnification is variable similarly also in the case of FIG. 17B. In this case, moreover, the position of the image is shiftable in the slit lengthwise direction insofar as a definite relationship is maintained between the magnification and the position.

The two-prism system described with reference to FIG. 12 is more advantageous than the single-prism system described with reference to FIG. 10, as already stated.

Accordingly when the prism 10 of FIG. 16 is replaced by the two-prism system described, aberrations, etc. can be corrected to afford copy images of improved quality.

Figures 20A, 20B, 20C, 20D:
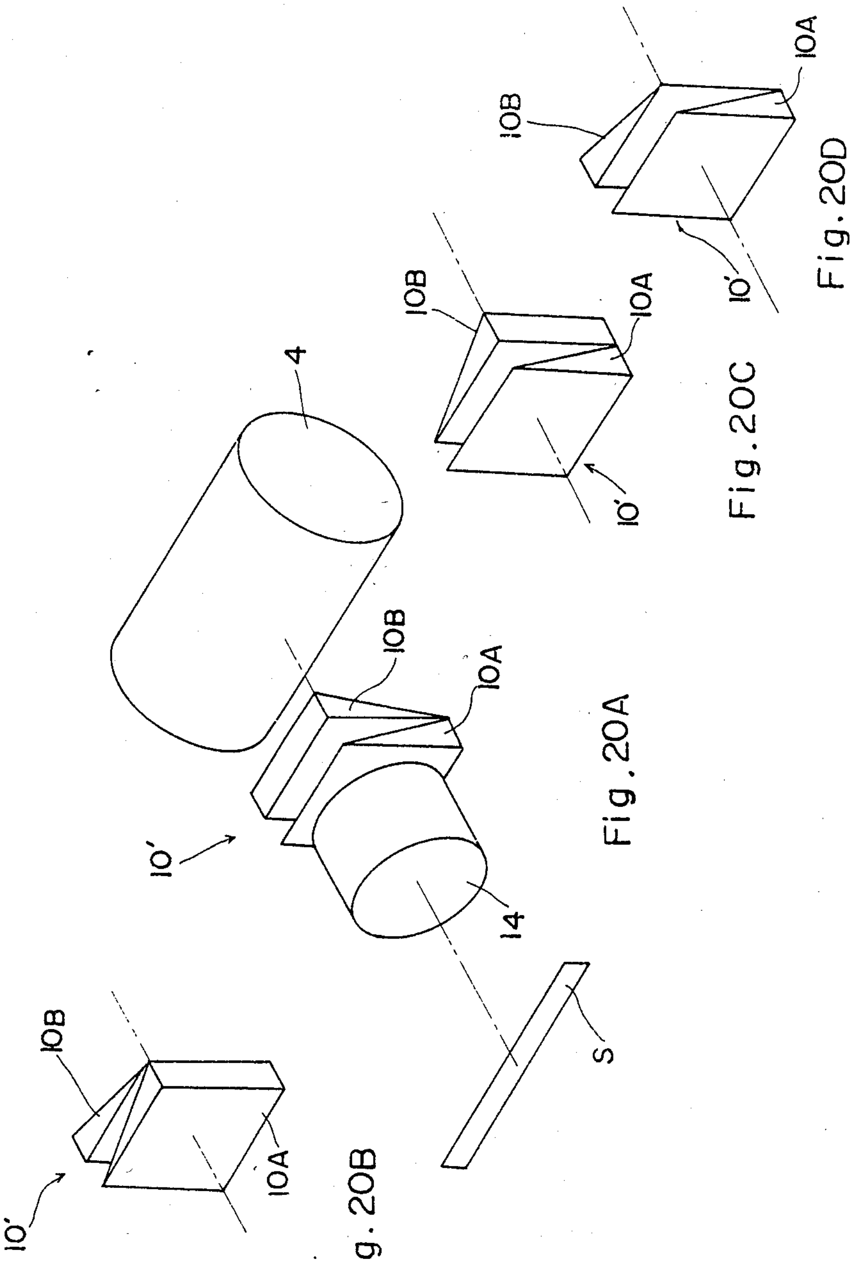
FIGS. 20A to 20D are diagrams showing an embodiment wherein two prisms are disposed in the vicinity of a projection lens, one or both of the prisms being rotatable about the optical axis of projection.

Furthermore, the two-prism system 10′ is made rotatable exactly in the same manner as the prism shown in FIG. 17, i.e. from the state of FIG. 20A to the state of FIG. 20B.

In the case of the two-prism system 10′, moreover, only one of the prisms can be rotated to the state of FIG. 20C or to the state of FIG. 20D. As in Table 1, Table 7 shows the magnification of the projection lens, scanning speed and lengthwise and widthwise magnifications in this case.

TABLE 7

| | Case I | Case II |
|---|---|---|
| Magnification of projection lens | $\beta 1$ | $\beta 1/\beta 2A$ |
| Scanning speed | $V/\beta 1\beta 2A$ | $V/\beta 1$ |
| Lengthwise magnification | $\beta 1\beta 2B$ | $\beta 1\beta 2B/\beta 2A$ |
| Widthwise magnification | $\beta 1\beta 2A$ | $\beta 1$ |

In the present arrangement, the fixed prism 10A toward the projection lens has a magnification of $\beta 2A$, and the rotatable prism 10B a magnification of $\beta 2B$.

In this way, rotation of one of the prisms only gives anamorphic magnification involving different vertical-to-horizontal ratios, with the copy image deviated toward one side, and an increased number of different vertical-to-horizontal ratios are available.

Further with the two-prism system 10′, as in the case of a single prism, one or both of the prisms can be rotated about an axis parallel to the ridgeline to vary the magnification (see FIG. 20A). The magnification can be calculated by applying the method used for the foregoing case of single prism. Additionally, the two-prism system is usable in the following manner. When an arrangement including a single prism is to be returned to the usual mode of varying magnification, there is the need to retract the prism from the optical path and to correct the resulting variation in the length of optical path, etc., whereas with the two-prism system, a refractive power for the magnification of 1X can be obtained by suitably setting the angle of incidence and vertex angle of the prism without the necessity of correcting the length of optical path. FIG. 21B shows prisms 10A and 10B as moved to give the magnification of 1X. Further when having the same vertex angle, the two prisms can be joined together as shown in FIG. 21C, with the incidence surface and the emergence surface positioned perpendicular to the optical axis of the projection lens, whereby the system can be made equivalent to a planar glass plate having no refractive power.

Table 8 shows data relating to the arrangement of FIGS. 21A and 21B, in which the vertex angle and refractive index of each prism is 15° and 1.5168, respectively. The inclination of image surface, Δ′, is calculated from Equations (14) and (15). The angles of incidence on the prisms 10A and 10B are represented by $\theta 1$ and $\theta 3$, respectively.

TABLE 8

| | FIG. 21A | FIG. 21B |
|---|---|---|
| Angle of incidence $\theta 1$ | 0° | 11.4° |
| Angle of incidence $\theta 3$ | 0° | −11.4° |
| Magnification | 0.91 | 1 |
| Inclination of image surface Δ′ | −0.01h′ | 0 |

FIG. 22 shows that the position of image can be altered by shifting a prism 10 in the direction in which it has a refractive power. In the case of FIG. 18, this adjusts the blank area Z. The deviation of image forming position produced when the prism is rotated can be corrected by the shift of the prism.

Figure 26:
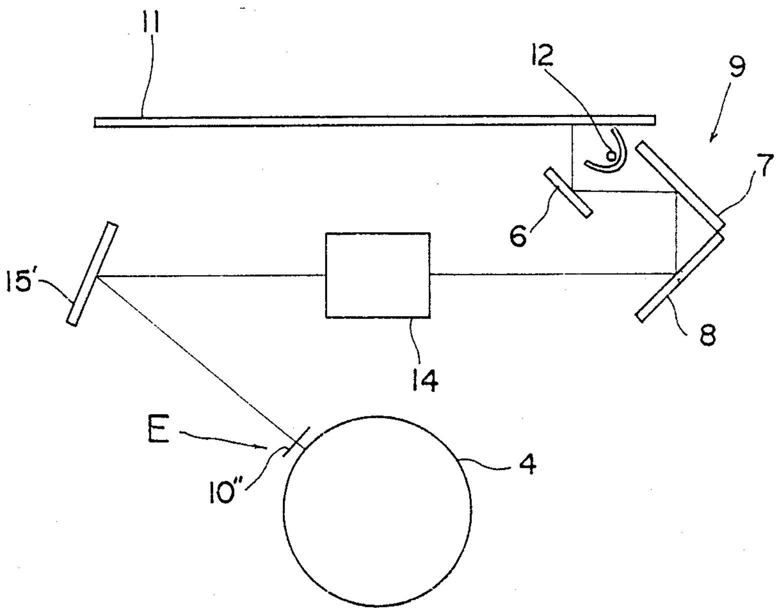
FIG. 26 is a diagram showing a copying machine incorporating a prism plate.

Finally, FIG. 26 shows an embodiment of anamorphic copying machine incorporating a prism plate which is an assembly of fine prisms. The copying machine includes a movable optical system. Thus, a scanning system 9 comprising an illuminating device 12 and first to third mirrors 6, 7, 8 is moved along the bottom surface of an original support 11, whereby the image of an original on the support 11 is scanned in the form of a slit. The scanned image is projected through a projection lens 14 and a fourth mirror 15′ onto a photosensitive member 4 at an exposure station E to form an electrostatic latent image on the photosensitive member 4. A copy image corresponding to the latent image is obtained by depositing a toner on the member 4, transferring the toner image to copy paper and fixing the transferred toner image.

The projection lens 14 is movable axially thereof by a stepping motor or the like and can be held in a desired position to copy the image of the original at a desired altered magnification in both vertical and horizontal directions.

The speed of of the drive system for the scanning system 9 is variable by a d.c. motor or the like. Thus, the scanning speed of the scanning system 9 is varied to alter the ratio of this speed to the speed of movement of the photosensitive member 4, whereby the copying magnification in the slit widthwise direction is varied relative to that in the slit lengthwise direction. This realizes copying with anamorphic magnification, i.e. with different magnifications in the vertical and horizontal directions.

According to the present embodiment, a prism plate 10″ in the form of an assembly of fine prisms is provided between the fourth mirror 15′ and the photosensitive member 4 to obtain a match between the speed of the image to be projected on the member 4 and the speed (peripheral speed) of movement of the member 4.

The prism plate 10″, which has approximately the same length as the photosensitive member 4, is disposed in the vicinity of the member 4. The prism plate 10″ has no refractive action in the slit lengthwise direction but performs a refractive action only in the slit widthwise direction and therefore has an anamo-magnification of $\beta 2$ in this direction.

With the embodiment described, the position of the projection lens 14 and the original scanning speed when the peripheral speed of the photosensitive member is V are set to the values listed in Table 1 for two cases I and II, as is the case with the embodiment of FIG. 2.

Figure 27:
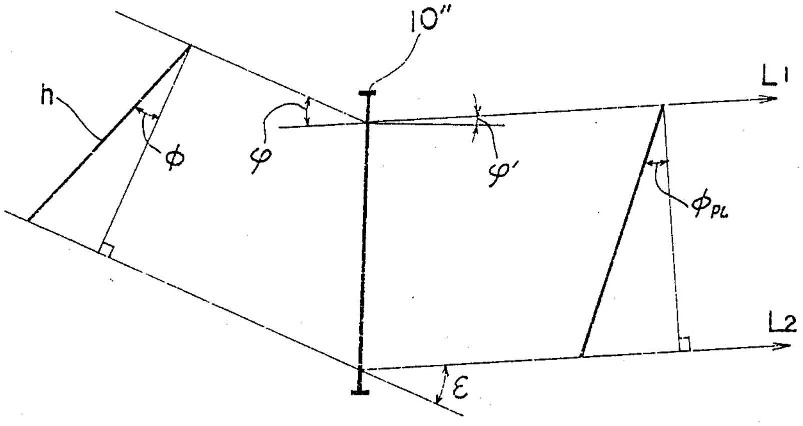
FIG. 27 is a diagram for calculating the magnification given by the refractive action of the prism plate.

The arrangement of the present embodiment including the prism plate 10″ will be described further with reference to FIG. 27. The magnification $\beta$PL of the prism plate and the angle of rotation of image, $\omega$PL, can be calculated from Equations (19), (20) and (21) to follow, using the angle of incidence of the principal beam on the prism plate 10″ and the inclination of image relative to the incident principal beam as main parameters.

$$\beta PL = \frac{hPL}{h} = \frac{\sqrt{\sin(\phi+\psi)\{\sin(\phi+\psi) - 2\cos\phi\sin\psi'\} + \cos^2\phi}}{\cos\psi} \quad (19)$$

$$\omega PL = \phi PL - \phi - \epsilon \quad (20)$$

wherein $$\phi PL = \cos^{-1}\left(\frac{\cos\phi\cos\psi'}{\sqrt{\sin(\phi+\phi)\{\sin(\phi+\psi) - 2\cos\phi\sin\psi'\} + \cos^2\phi}}\right) \quad (21)$$

In the above equations:

h, hPL: height of image within the principal beam $\phi$, $\phi$PL: inclination of image relative to the principal beam $\epsilon$: angle of refraction given by the prism plate $\psi$: angle of incidence on the prism plate $\psi'$: angle of emergence from the prism plate $\psi'=\psi-\epsilon$ Of the parameters given above, those representing angles are positive when clockwise.

Figure 28:
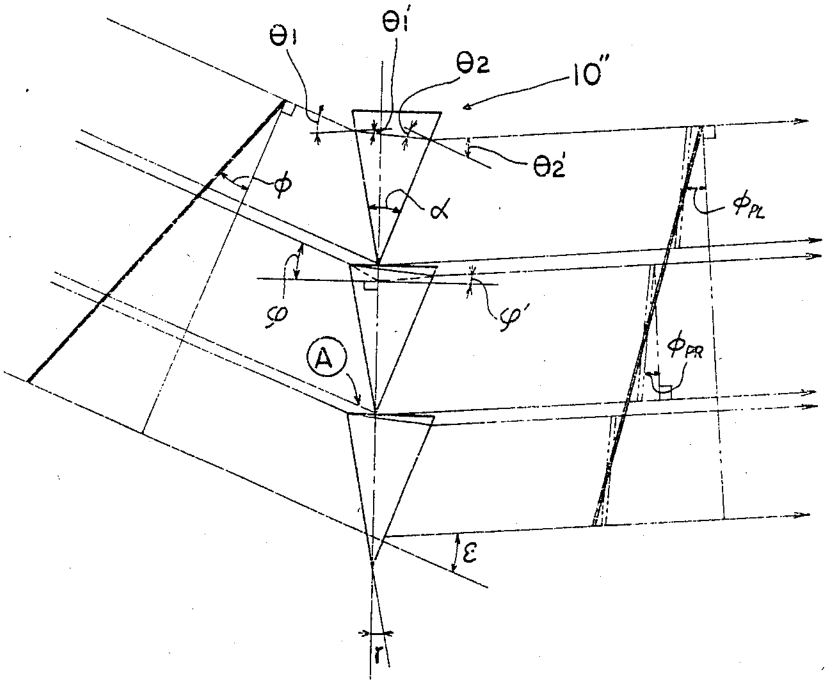
FIG. 28 is an enlarged fragmentary diagram for calculating the magnification given by the refractive action of the prism plate.

FIG. 28 shows on an enlarged scale a portion of the prism plate 10″ in the form of an assembly of fine prisms. In this diagram, $\alpha$, $\theta 1$, $\theta 2'$, $\epsilon$, $\psi$, $\psi'$, $\phi$ and $\phi$PL are in common with those shown in FIGS. 3, 4, 5 and 27. Represented by $\phi$PR is the inclination of image with respect to the principal rays in each fine prism, and by $\gamma$ is the angle between the incidence surface of each fine prism and the prism plate (positive when clockwise with respect to the prism plate).

There are the following relations.

$$\psi=\gamma+\theta 1 \quad (22)$$

$$\psi'=\theta 1'-\gamma-\alpha \quad (23)$$

(In FIG. 28, $\psi'$ is negative.)

The rotational angle of image, $\omega$PR, in each fine prism is $$\omega PR=\phi PR-\phi-\epsilon \quad (24)$$

wherein $$\phi PR = \cos^{-1}\left(\frac{\cos\theta 1' \cos\theta 2'}{\sqrt{(\cos\theta 1'\cos\theta 2')^2 + \left(\frac{n^2-1}{n}\sin\alpha + \tan\phi\right)^2}}\right) \quad (25)$$

The prism plate 10″ gives anamorphic magnification when the following equation is satisfied.

$$\beta PR \cos\phi PR=\beta PL \cos\phi PL \quad (26)$$

This means that in view of Equations (22) and (23), there is no condition which satisfies both (12)′=(19) and (24)=(20) (i.e. (25)=(21)) at the same time.

Thus, from Equations (12)′, (19), (21), (22), (23) and (25), $\gamma$ is to be determined which has the relation of $$\frac{\cos\theta 1' \cos\theta 2'}{\cos\theta 1 \cos\theta 2} = \frac{\cos(\theta 2' - \alpha - \gamma)}{\cos(\theta 1 + \gamma)} \quad (27)$$

(The angle $\gamma$ is not dependent on $\phi$.) Equation (10) gives such $\gamma$.

$$\gamma = \tan^{-1}\left(\frac{\cos\theta 1(\cos\theta 1' \cos\theta 2' - \cos\theta 2 \cos(\theta 2' - \alpha))}{\cos\theta 1 \cos\theta 2 \sin(\theta 2' - \alpha) + \sin\theta 1 \cos\theta 1' \cos\theta 2'}\right) \quad (28)$$

Equation (26) indicates that the differences between the prism plate and single prisms in magnification and image rotation are allowable if the width of the principal beam is large to some extent as compared with the size of the single prisms.

In practice, the angular difference of image rotation only matters, but when this is regarded as astigmatism, the value is smaller than in the case of anamorphic magnification given by the single prism of FIG. 3.

With reference to FIG. 28, the eclipse of beams will be described. An eclipse occurs because the prism has a surface (surface A in FIG. 28) which does not produce the action of prism.

However, with slit scanning optical systems generally used for plain paper copier or the like, an eclipse, even if occurring, creates no defect in copy images as far as the scanning direction (direction perpendicular to the slit lengthwise direction) is concerned, because in the scanning direction, a point on the original moves perpendicular to the slit lengthwise direction and is exposed to light and projected on the photosensitive member during travel over the width of the slit. Accordingly, even if a prism plate which eclipses the beam is positioned in the scanning direction, the plate permits exposure, merely resulting in a reduced amount of exposure. It is therefore desirable to eliminate the eclipse if possible, to remedy the reduction in the amount of exposure due to the eclipse.

Figure 29A:
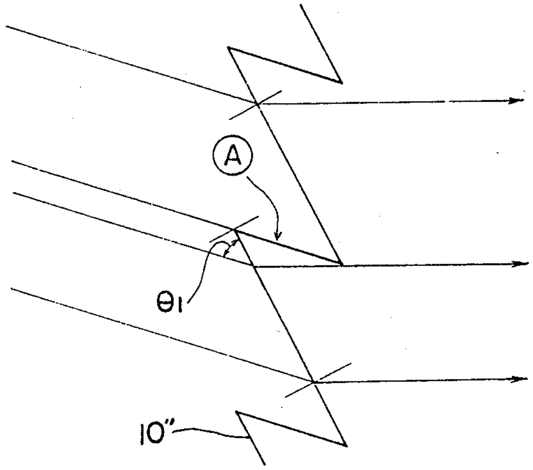
FIGS. 29A and 29B are diagrams illustrating shading.
Figure 29B:
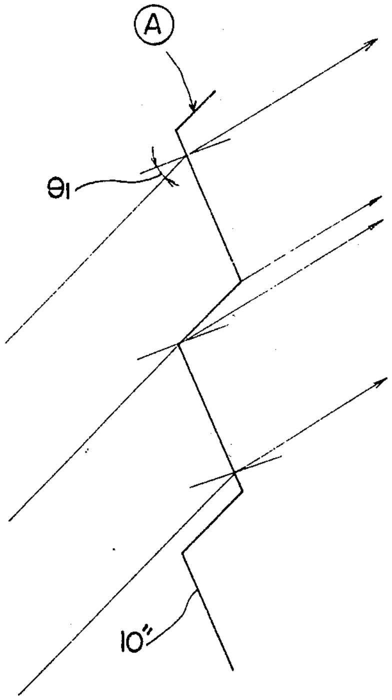

An eclipse caused by a surface of the prism plate on the incidence side thereof will be described further with reference to FIGS. 29A and 29B. The surface corresponds to the surface A in FIG. 28 and is so prepared as to be positioned in parallel with the incident beam. FIG. 29A shows a case wherein $\theta 1>0$, and FIG. 29B shows a case wherein $\theta 1<0$. The incident beam is eclipsed in either case. To eliminate the eclipse, there is a need to make $\theta 1$ equal to 0 (i.e. to render the beam incident on the prism surface perpendicular thereto) or to render the incidence surface planar.

Figure 30A:
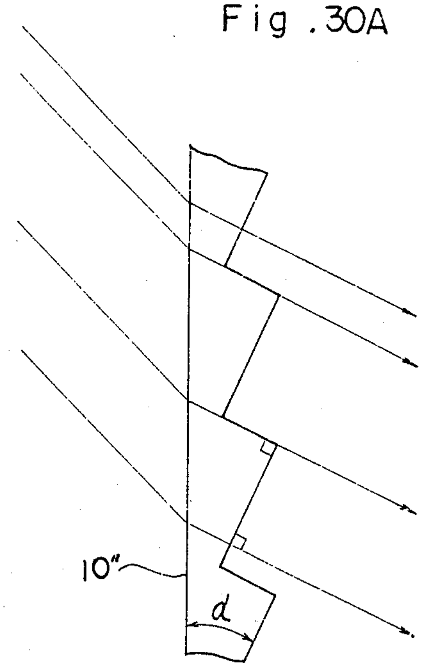
FIGS. 30A and 30B are diagrams showing embodiments of prism plate for eliminating shading.
Figure 30B:
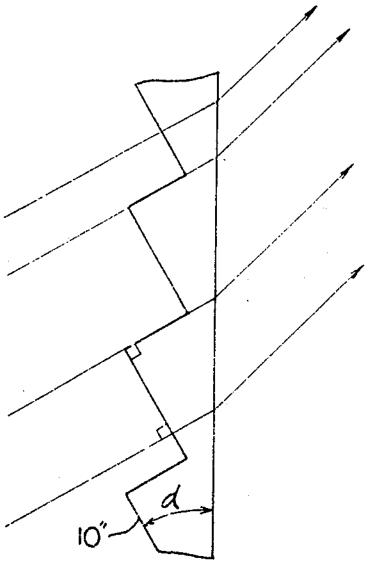

FIGS. 30A and 30B each show a prism plate 10″ one surface of which is planar. In FIG. 30A, $\gamma=0$, and in FIG. 30B, $\gamma=-\alpha$. In each of these cases, Equation (27) leads to the following relationship.

When $\gamma=0$:

$$\frac{\cos\theta 1' \cos\theta 2'}{\cos\theta 1 \cos\theta 2} = \frac{\cos(\theta 2' - \alpha)}{\cos\theta 1}$$

Therefore, $\cos\theta 1' \cos\theta 2'=\cos\theta 2 \cos(\theta 2'-\alpha)$

However, from $$\theta 1'=\theta 2+\alpha,$$

$$\cos(\theta 2+\alpha)\cdot\cos\theta 2'=\cos\theta 2\cdot\cos(\theta 2'-\alpha)$$

$$-\sin\theta 2\cdot\cos\theta 2' \sin\alpha=\cos\theta 2\cdot\sin\theta 2' \sin\alpha$$

$$\sin\theta 2\cdot\cos\theta 2'+\cos\theta 2 \sin\theta 2'=0 \text{ (since } \sin\alpha\neq 0)$$

Hence, $\sin(\theta 2+\theta 2')=0$ $$\theta 2+\theta 2'=0$$

On the other hand, from Snell's law, $n\sin\theta 2=\sin\theta 2'$, and $n\neq 1$, so that $$\theta 2=\theta 2'=0$$

When $\gamma=-\alpha$:

Similarly, $$\cos\theta 1' \cos(\theta 1-\alpha)=\cos\theta 1 \cos\theta 2$$

$$\cos\theta 1' \cos(\theta 1-\alpha)=\cos\theta 1 \cos(\theta 1'-\alpha)$$

Therefore, $\sin(\theta 1-\theta 1')=0$

Hence, $\theta 1=\theta 1'=0$ (since $n\neq 1$)

Thus the eclipse can be inhibited very advantageously by using the prism plate 10″ for giving anamorphic magnification as shown in FIGS. 30A or 30B wherein when the incidence side is planar as seen in FIG. 30A, each component prism is adapted to emanate rays perpendicular to its surface on the opposite side, or when the emergence side is planar as seen in FIG. 30B, the incidence surface of each component prism is arranged perpendicular to incident rays. When the prism plate 10″ in the form of an assembly of fine prisms has one plane surface and the other surface which is provided by surfaces of the prisms as illustrated, the prism plate has the advantage of being easier to fabricate than the one shown in FIG. 28 which is a simple assembly of fine prisms arranged one above another.

Figure 31:
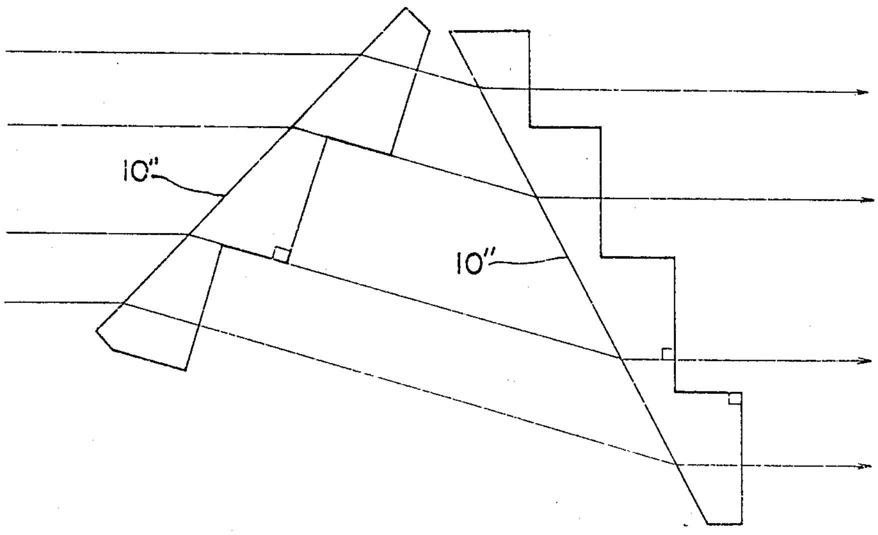
FIGS. 31 and 32 are diagrams each showing an arrangement of two prism plates used in combination.
Figure 32:
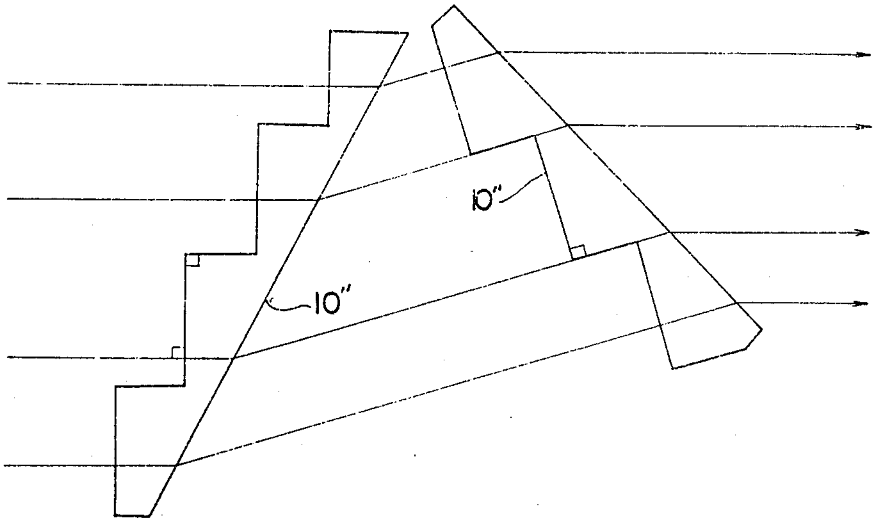
Figure 33:
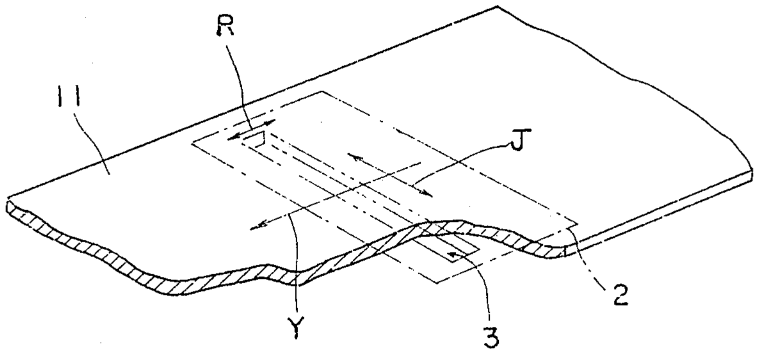
FIG. 33 is a diagram illustrating the relationship between the original scanning direction and the orientation of a slit.

FIGS. 31 and 32 each show an arrangement of two prism plates each having a plane surface and a composite prism surface. These arrangements are useful for inhibiting eclipses and are also advantageous for greatly diminishing chromatic aberration and astigmatic difference.

The present invention is not limited only to the illustrated construction of prism plates 10″.

Although the present invention has been described above as embodied as copying machines of different types having a slit exposure system, it is apparent that the embodiments described are usable for copying machines, having a slit exposure system, of any type, i.e. original support movable type, scanning system movable type or original movable type.

What is claimed is:

1. A slit exposure type copying machine capable of copying with anamorphic magnification comprising:

moving means for moving a photosensitive member past an exposure station at a predetermined speed, means for scanning the image of an original in the form of a slit, projection means for projecting the scanned original image on the photosensitive member at the exposure station to form an image on the member, means for driving the scanning means at a scanning speed corresponding to a magnification different from the magnification of the projection means, and at least one triangular prism disposed in the optical path from the original to the photosensitive member for performing a refractive action only in the scanning direction, the degree of the refractive action being so set as to compensate for the difference between the magnification of the projection means and the magnification corresponding to the speed of the scanning means.

2. A copying machine as defined in claim 1 wherein the magnifications of the projection means and the scanning means are each variable independently of the other, and the angle of incidence of rays on the triangular prism is variable in a plane parallel to the scanning direction.

3. A copying machine as defined in claim 2 wherein the triangular prism is supported rotatably about an axis perpendicular to the scanning direction.

4. A copying machine as defined in claim 1 which comprises two triangular prisms arranged with their vertex angles oriented in directions opposite to each other.

5. A copying machine as defined in claim 1 wherein said at least one triangular prism is supported rotatably about an axis perpendicular to the scanning direction.

6. A copying machine as defined in claim 1 wherein the triangular prism comprises fine prisms continuously arranged substantially in a plane and assembled into a plate.

7. A copying machine as defined in claim 6 wherein one surface of the plate of fine prisms is planar, and stepped portions formed in the other surface of the plate between the fine prisms are parallel to a beam incident on or emerging from said other surface.

8. A copying machine as defined in claim 6 wherein two plates of fine prisms are arranged in combination at a specified angle.

9. A copying machine as defined in claim 1 wherein the projection means is a lens, and the triangular prism is disposed in the vicinity of the lens.

10. A slit exposure type copying machine capable of copying with anamorphic magnification comprising:

moving means for moving a photosensitive member past an exposure station at a predetermined speed, means for scanning the image of an original in the form of a slit at a specified speed, a projection lens for projecting the scanned original image on the photosensitive member at the exposure station to form an image on the member, and at least one triangular prism disposed in an optical path in the vicinity of the projection lens for performing a refractive action only in one direction.

11. A copying machine as defined in claim 10 wherein the triangular prism is rotatable about the optical axis of the projection lens, and the scanning means is adjusted to a scanning speed different to the scanning speed corresponding to the magnification of the projection lens when the triangular prism is in a position to perform the refractive action in the scanning direction, the scanning means being adjustable to the scanning speed corresponding to the magnification of the projection lens when the triangular prism is in a position to perform the refractive action in a direction perpendicular to the scanning direction.

* * * * *